United States Patent [19]  [11] 4,327,606
Howden  [45] May 4, 1982

[54] METHOD OF MAKING A MASTER REPLICATING TOOL

[75] Inventor: Harry Howden, Smallfield, England

[73] Assignee: U.S. Philips Corporation, New York, N.Y.

[21] Appl. No.: 91,306

[22] Filed: Nov. 5, 1979

[30] Foreign Application Priority Data

Nov. 6, 1978 [GB] United Kingdom ............... 43277/78

[51] Int. Cl.³ ...................... B23P 15/24; C25D 5/54
[52] U.S. Cl. ..................................... 76/107 R; 204/30
[58] Field of Search .................... 76/101 R, 107 R; 425/808; 249/114 R, 115; 264/219, 1; 351/177; 204/6, 30; 51/281 R, 283 R, 284 R

[56] References Cited

U.S. PATENT DOCUMENTS

| | | | |
|---|---|---|---|
| 1,575,122 | 3/1926 | Madsen | 428/469 |
| 2,253,697 | 8/1941 | Genesy | 76/107 R |
| 3,629,388 | 12/1971 | Wolf et al. | 264/219 |
| 3,792,986 | 2/1974 | Scott et al. | 249/114 R |
| 3,842,713 | 10/1974 | Hamilton | 51/284 |
| 4,017,238 | 4/1977 | Robinson | 425/808 |

FOREIGN PATENT DOCUMENTS 2356910  5/1975  Fed. Rep. of Germany .... 76/107 R

*Primary Examiner*—Roscoe V. Parker
*Attorney, Agent, or Firm*—Thomas A. Briody; William J. Streeter; Rolf E. Schneider

[57] ABSTRACT

A method of making a master replicating tool having a predetermined negative aspherical profile from which aspherical profiled optical elements can be made, comprising machining a blank of a hard, non deformable siliceous material with a cutting tool in a one stage machining operation to produce substantially the predetermined profile, coating the surface so produced with a layer of nickel or nickel based alloy, machining the nickel or nickel based alloy to produce the predetermined profile with the cutting tool and protecting the surface by applying a layer of an inert, scratch-resistant material thereon. Hand figuring the blank after machining is avoided. The scratch-resistant layer is thin and can be between 500 Å and 5000 Å thick. This layer is applied by vapour deposition and is preferably vacuum deposited vitreous carbon. The blank is machined to produce the substantial predetermined profile to within the limits determined by the fracture planes of the siliceous material which are produced during the machining operation and these fracture planes may be less than 20 μm for ceramic materials.

6 Claims, No Drawings

METHOD OF MAKING A MASTER REPLICATING TOOL

This invention relates to a method of making a master replicating tool having a predetermined, aspherical negative profile from which a plurality of substantially identical lenses or mirrors each with a positive profile of the negative aspherical profile can be made, comprising working the surface of a blank of a hard, non-deformable material to form the profile. Lens and mirror designers have long been inhibited in specifying optical designs because of the difficulties involved in producing relatively large numbers of identical and accurately profiled optical elements with aspherical surfaces. It is well known that it is a highly skilled and time consuming process to form one aspherical profile with a predetermined configuration from a blank of a hard, non-deformable material. Materials which are known to be preferred for use as master replicating tools have not been machined in a single stage operation to the required limits of accuracy for use in preparing aspherical optical elements. It is, for example, normal practice to form a first approximate shape of the profile which is then worked by grinding to the predetermined profile, then lapping and hand figuring and optically polishing the surface to form the predetermined profile of the master replicating tool. The accuracy of the first profile produced by machining is dependent, inter-alia, upon the physical characteristics of the material being machined. The harder the material the more likely it is to have defects due to, for example, surface fractures being produced on the machined surface. Various attempts have been made to simplify the profiling and polishing process without producing any loss of accuracy in the final profile surface. U.K. Pat. No. 1,301,551 describes the use of a hard, non-deformable moulding tool in a method of manufacturing an aspheric optical element comprising a light transmissive substrate having a surface coated with a layer of a light transmissive thermosetting synthetic material the outer surface of which is aspheric in which the substrate surface is processed to enable the thermosetting material to adhere thereto and is placed facing and adjacent an aspheric mould surface which has been processed to enable said material to be separated therefrom, after which said material in liquid form is injected into the space between said surfaces and cured, said element then being removed from the mould.

The master moulding tool has a limited life and if a long production run of optical elements is required more than one identical, master moulding tools have to be used. This moulding tool is also made to an accuracy which can compensate for the amount of shrinkage that the thermosetting material has during curing. It is clear that for physical reasons the profile of the mould needs to be of a hard, non-deformable material which can be accurately profiled and surface finished to an optical surface finish at least equal to the optical finish of the element resulting therefrom. Thus, any substrate to the profiled surface can be used providing it is sufficiently strong to support the surface and has a low coefficient of thermal expansion over the temperature range in use. Skilled workers have traditionally used cut and try techniques to produce satisfactory optical surfaces on hard materials, such as glass, but these methods are both time consuming and expensive.

Mechanical methods of producing a predetermined aspherical profile and surface finish on a glass master moulding tool can be used but the methods commonly rely on techniques for producing spherical glass optics.

The mechanical methods furthermore have not been applicable to the production of sufficiently accurate aspherical surfaces. One problem is that aspherical surfaces can not be formed by a simple mechanical motion as are spherical surfaces, and machines which are specifically designed to produce aspherical surfaces have the disadvantage that they are subject to mechanical variations which can not be easily eliminated. For example, a known technique can be used of tracking a cutting tool or a polishing tool across a surface to produce an aspheric surface which tool may be operated under the control of a cam, a programmed punched tape or another programmed source of information. However, this technique does not eliminate errors due to backlash of the mechanical action for very hard materials, or machine chatter due to undue vibration or bearing play due to wear or even errors residing in the information store. Furthermore, the above mentioned defects of surface fracture of the material on being machined, ground or lapped may still occur depending upon the brittleness of the material being worked. To avoid many of these disadvantages the surface of a blank of a hard, non-deformable material such as glass is worked to form a first approximate shape of the desired profile for example by rough grinding. This is followed by smooth grinding with a metal tool using a fine abrasive slurry comprising diamond or carborundum and further followed by cerium oxide or iron oxide polishing with felt or pitch. The surface and profile produced however, then require checking for accuracy and at least some re-figuring and polishing by hand in order to achieve the desired profile accuracy and predetermined finish. This technique is necessary to produce each master replicating tool in order to ensure that replicated optical elements produced from different master tools give similar optical performances.

The use of a glass as the hard non-deformable material has the disadvantage in that it is a brittle material and any final fine mechanical grinding results in surface defect fractures which are deeper than are permissible for the desired profile accuracy and polish. Such surface defect fractures may be up to 20 $\mu$m deep whereas the optical finish for the predetermined profile is required to have an accuracy of at least 10 $\mu$m and for some applications less than 0.5 $\mu$m of the predetermined profile.

One object of the present invention is to mitigate the aforesaid disadvantages by providing an improved method of producing one or a number of master replicating tools.

Another object of the invention is to provide a method of making a master replicating tool comprising a hard, non-deformable siliceous material which has reduced surface defect fractures on machining.

A further object of the invention is to provide a method of making a master replicating tool comprising a hard, non-deformable siliceous material having a low coefficient of thermal expansion which forms a substrate for a surface coating which is easily machined and polished.

According to the present invention there is provided a method of making a master replicating tool having a predetermined aspherical negative profile from which a plurality of substantially identical lenses or mirrors each with a positive profile of the negative aspherical profile can be made, comprising working the surface of a blank of a hard, non-deformable material to form the profile, characterised in that the hard, non-deformable material comprises a siliceous material which is machined with a cutting tool to produce substantially the predetermined profile in a one stage operation and the siliceous surface is coated with a layer of nickel or a nickel based alloy after which the nickel surface is machined with the cutting tool and polished to an optical finish to produce the predetermined profile and the profiled surface is protected by applying a layer of an inert scratch-resistant material thereon by vacuum deposition.

The hard, non-deformable machineable siliceous material may be a ceramic or a glass with a low coefficient of thermal expansion over the temperature range of $+150°$ C. to $-50°$ C., said material being capable of being machined with a single point machine cutting tool as, for example, for ceramic siliceous materials, or machined by grinding, as for example, for glassy siliceous materials, such as, titanium silicate glasses, without producing fracture planes greater than 20 $\mu$m deep on the machined surface. The surface of a glass siliceous material as hereinafter described was machined to within 20 $\mu$m of the predetermined profile.

In one embodiment the nickel based alloy deposited on the machined siliceous surface is between 30–100 $\mu$m thick before polishing. Suitable, hard non-deformable materials are siliceous compounds comprising a ceramic which has been moulded and fired to form the blank. The blank is subsequently machined in a single stage operation to substantially the predetermined profile. Other suitable materials are glasses which have a low coefficient of thermal expansion and which have been partially devitrified, for example, by ion exchange techniques in which a glass is placed in a bath of a salt and the ions of the salt are exchanged for those in the glass; the amount of devitrification being dependent upon the salt material, the glass composition and the length of time and the temperature at which the ion exchange diffusion process takes place. Still further suitable materials are semi-crystalline glass ceramics, such as, described in U.K. Pat. No. 1,151,770 which materials may be machined without forming surface fracture defects greater than 5 to 10 $\mu$m after which the surface may be coated with a metal of a type which is softer than the fairly hard, semi-crystalline glass ceramic and wherein the metal is removable only with difficulty. Alkali-silicate glasses in which $Al_2O_3$ has been introduced are also suitable. These siliceous materials are crystalline alumino-silicates in which the $3+Al$ ion has replaced $4+Si$ ions in the tetragonal position or positions so that a silicate structure is maintained. The siliceous material may have a linear coefficient of thermal expansion of $0.65 \times 10^{-4}$ or less and preferably less than $0.05 \times 10^{-4}$. A particularly suitable non deformable siliceous material is titanium silicate. Titanium silicate and borosilicate glasses in particular have a very low coefficient of thermal expansion. Borosilicate glass known under Code No. 7059 (Corning Glass Works) is suitable, which glass has, for example, a coefficient of thermal expansion of $4.6 \times 10^{-6}$ per °C., said glass being capable of being ground and polished with substantially no surface imperfections.

When the nickel or nickel based alloy is deposited on the surface of the machined siliceous surface by electrodeposition a conductive coating on the siliceous surface is to be used to form a cathode.

The layer of nickel deposited is sufficiently thick so that it can be finely machined, for example, with a single point diamond machine cutting tool. In one embodiment the layer of nickel was finely machined to within 2 $\mu$m of the predetermined profile in one machining operation with a single point diamond machine tool and the surface was subsequently machine polished. The nickel layer is then protected from damage by being surface coated with a layer of an inert scratch-resistant material.

Suitable inert scratch-resistant materials may be any conventional material, such as, magnesium fluoride or manganese dioxide applied by vacuum deposition, such as, electron beam deposition or sputter deposition. In order to provide good mould release characteristics a particularly suitable inert, scratch-resistant material is vapour deposited vitreous carbon.

Vitreous carbon is deposited on the nickel surface as the result of thermal degradation of an organic polymer in a neutral atmosphere. The property of the vitreous layer depends to some extent on the reaction conditions, the polymer and the temperature. In general, the vitreous carbon has a glass-like appearance and exhibits a conchoidal fracture. It is considered that the vitreous carbon layer deposited is a non-porous crystallite structure which forms a number of small hexagonal planes with little or no true graphitic orientation between the planes. Some tetrahedral bonding may occur and the resulting vitreous carbon layer has a hardness of between 6–7 mohs. The scratch-resistance of the vitreous carbon layer is good and the layer acts as a release agent in use. The vitreous carbon is inert and resistant to chemical attack by a variety of corrosive materials such as nitric, hydrofluoric, sulphuric and chromic acids and it is chemically cleaned after use by washing with acids, such as, aqua regia or mixtures of $HCl/HNO_3$ solutions.

A layer of vapour deposited vitreous carbon of 2000 Å thickness is deposited on the surface of a layer of polished nickel of 60 $\mu$m thickness.

In a further embodiment a blank of a hard, non-deformable titanium silicate is machined with a diamond point cutting tool in a single stage operation to form a profile within 50 $\mu$m of the predetermined profile. A layer of nickel 5000 Å thick is deposited on the machined profiled surface by vapourised nickel metal technique in a vacuum. Thereafter a layer of electrochemically deposited nickel of 0.2 mm thickness is deposited on the surface of the vapour deposited nickel layer by electrodeposition from a standard Watts' nickel electroplating bath.

The surface of the deposited nickel is then machined with a single point cutting tool in another single stage machining operation to produce the predetermined profile. An optical finish is then produced on the profile by polishing and the polished surface is protected by the application of an inert scratch-resistant coating. The inert scratch-resistant coating is deposited by vapour deposition of vitreous carbon. The thickness of the vapour deposited vitreous carbon is approximately 1500 Å.

We claim:

1. A method of making a master replicating tool having a predetermined aspherical negative profile, which comprises initially machining the surface of a blank of a hard, non-deformable siliceous material with a cutting tool in a one-stage operation to produce approximately the predetermined profile with any fracture planes having a maximum depth of 20 $\mu$m; coating the resulting machined surface with a nickel or a nickel-based alloy layer having a thickness of 30 to 100 μm; thereafter machining the nickel-coated surface with the cutting tool and polishing said surface to an optical finish to produce essentially the predetermined profile; and applying a layer of an inert, scratch-resistant material to said profiled surface to protect the same.

2. A method according to claim 1, in which the hard, non-deformable siliceous material comprises a ceramic or a glass having a low coefficient of thermal expansion over a temperature range of +150° C. to −50° C.

3. A method according to claim 1 or 2, in which the hard, non-deformable siliceous material is initially machined to within 20 μm of the predetermined profile.

4. A method according to claim 1 or 2, in which the nickel or nickel-based alloy layer is formed on the initially machined surface by electrochemical deposition or by a vapourised metal deposition technique.

5. A method according to claim 1 or 2, in which the layer of inert, scratch-resistant material comprises vapour-deposited vitreous carbon and has a thickness of 500 Å to 5000 Å.

6. A method according to claim 1 or 2, in which the nickel or nickel-based alloy layer is machined to within 5 μm of the predetermined profile and then polished to within 2 μm or less of the predetermined profile.

* * * * *